US009684817B2

(12) United States Patent
Huang

(10) Patent No.: US 9,684,817 B2
(45) Date of Patent: Jun. 20, 2017

(54) METHOD AND SYSTEM FOR AUTOMATICALLY OPTIMIZING QUALITY OF POINT CLOUD DATA

(71) Applicant: SHENZHEN INSTITUTES OF ADVANCED TECHNOLOGY CHINESE ACADEMY OF SCIENCES, Shenzhen (CN)

(72) Inventor: Hui Huang, Shenzhen (CN)

(73) Assignee: Shenzhen Institutes Of Advanced Technology Chinese Academy Of Sciences, Shenzhen (CN)

( * ) Notice: Subject to any disclaimer, the term of this patent is extended or adjusted under 35 U.S.C. 154(b) by 91 days.

(21) Appl. No.: 14/893,035

(22) PCT Filed: Nov. 26, 2013

(86) PCT No.: PCT/CN2013/087824
§ 371 (c)(1),
(2) Date: Nov. 20, 2015

(87) PCT Pub. No.: WO2015/039375
PCT Pub. Date: Mar. 26, 2015

(65) Prior Publication Data
US 2016/0125226 A1    May 5, 2016

(30) Foreign Application Priority Data

Sep. 17, 2013  (CN) .......................... 2013 1 0424344

(51) Int. Cl.
*G06K 9/00* (2006.01)
*G06K 9/40* (2006.01)
(Continued)

(52) U.S. Cl.
CPC ..... *G06K 9/00214* (2013.01); *G06K 9/00201* (2013.01); *G06K 9/209* (2013.01);
(Continued)

(58) Field of Classification Search
CPC ..... G06T 17/20; G06T 17/00; G06T 2200/08; G06T 5/002; G06K 9/00214; G06K 9/209; G06K 9/40; G06K 9/56
See application file for complete search history.

(56) References Cited

U.S. PATENT DOCUMENTS 5,988,862 A * 11/1999 Kacyra ............... G01B 11/002
                                                      382/195
8,274,508 B2    9/2012 Porikli et al.
(Continued)

FOREIGN PATENT DOCUMENTS

CN    101082988 A    12/2007
CN    102169579 A    8/2011
(Continued)

OTHER PUBLICATIONS

Chang, Ming-Ching, et al. "Reliable fusion of knee bone laser scans to establish ground truth for cartilage thickness measurement." SPIE Medical Imaging. International Society for Optics and Photonics, 2010.*

(Continued)

Primary Examiner — Li Liu
(74) Attorney, Agent, or Firm — Ladas & Parry, LLP

(57) ABSTRACT

Disclosed is a method for automatically optimizing point cloud data quality, including the following steps of: acquiring initial point cloud data for a target to be reconstructed, to obtain an initial discrete point cloud; performing preliminary data cleaning on the obtained initial discrete point cloud to obtain a Locally Optimal Projection operator (LOP) sampling model; obtaining a Possion reconstruction point cloud model by using a Possion surface reconstruction method on the obtained initial discrete point cloud; performing iterative closest point algorithm registration on the obtained Possion reconstruction point cloud model and the obtained initial discrete point cloud; and for each point on a (Continued)

currently registered model, calculating a weight of a surrounding point within a certain radius distance region of a position corresponding to the point for the point on the obtained LOP sampling model, and comparing the weight with a threshold, to determine whether a region where the point is located requires repeated scanning. Further disclosed is a system for automatically optimizing point cloud data quality.

10 Claims, 2 Drawing Sheets

(51) Int. Cl.
    *G06K 9/20*     (2006.01)
    *G06K 9/56*     (2006.01)
    *G06K 9/62*     (2006.01)
    *G06T 15/10*     (2011.01)
    *G06T 19/20*     (2011.01)
    *G06T 19/00*     (2011.01)
    *G06T 5/00*     (2006.01)

(52) U.S. Cl.
    CPC ................. *G06K 9/40* (2013.01); *G06K 9/56* (2013.01); *G06K 9/6207* (2013.01); *G06K 9/6211* (2013.01); *G06K 9/6249* (2013.01); *G06T 5/002* (2013.01); *G06T 15/10* (2013.01); *G06T 19/00* (2013.01); *G06T 19/20* (2013.01); *G06T 2207/10028* (2013.01); *G06T 2210/56* (2013.01)

(56) References Cited

U.S. PATENT DOCUMENTS

| | | | | |
|---|---|---|---|---|
| 2005/0057561 A1* | 3/2005 | El-Din ElShishiny | . | G06T 17/20 345/419 |
| 2008/0306709 A1* | 12/2008 | Fisker | ...................... | G06T 17/00 702/167 |
| 2010/0085353 A1* | 4/2010 | Zhou | ........................ | G06T 17/00 345/419 |
| 2010/0328308 A1* | 12/2010 | Gamliel | .................. | G06T 17/20 345/420 |
| 2014/0267627 A1* | 9/2014 | Freeman | ............... | G01S 17/023 348/47 |
| 2016/0000518 A1* | 1/2016 | Thoranaghatte | ... | A61B 19/5244 703/11 |
| 2016/0071318 A1* | 3/2016 | Lee | ......................... | G06T 17/00 345/419 |
| 2016/0364905 A1* | 12/2016 | Jung | ....................... | G06T 19/20 |
| 2017/0053438 A1* | 2/2017 | Huang | .................... | G06T 17/20 |
| 2017/0056057 A1* | 3/2017 | Thapliyal | ....... | A61B 17/320068 |

FOREIGN PATENT DOCUMENTS

| | | |
|---|---|---|
| CN | 103065354 A | 4/2013 |
| CN | 103236064 A | 8/2013 |
| CN | 103247074 A | 8/2013 |
| EP | 2584533 A1 | 4/2013 |

OTHER PUBLICATIONS

Makadia, Ameesh, Alexander Patterson, and Kostas Daniilidis. "Fully automatic registration of 3D point clouds." Computer Vision and Pattern Recognition, 2006 IEEE Computer Society Conference on. vol. 1. IEEE, 2006.*
Rusu, Radu Bogdan, et al. "Aligning point cloud views using persistent feature histograms." Intelligent Robots and Systems, 2008. IROS 2008. IEEE/RSJ International Conference on. IEEE, 2008.*
ISR for PCT/CN2013/087824 mailed on Jul. 9, 2014 and its English translation by WIPO.
Written Opinion of the International Searching Authority for PCT/CN2013/087824 mailed on Jul. 9, 2014 and its English translation by WIPO.
International Preliminary Report on patentability Chapter I for PCT/CN2013/087824 mailed on Mar. 22, 2016 and its English translation by WIPO.
From CN201310424344.0 [Publication No. CN103489218 (A)], Search Report and its English machine translation from Bing.com Microsoft Translator.

* cited by examiner

METHOD AND SYSTEM FOR AUTOMATICALLY OPTIMIZING QUALITY OF POINT CLOUD DATA

CROSS-REFERENCE TO RELATED APPLICATIONS

This application is the U.S. National Stage of International Patent Application No. PCT/CN2013/087824 filed on Nov. 26, 2013, which claims the benefit of and priority to Chinese Patent Application No. 201310424344.0 filed on Sep. 17, 2013, the disclosures of which are hereby incorporated in their entireties by reference.

BACKGROUND

Technical Field

The present invention relates to a method and system for automatically optimizing point cloud data quality.

Related Art

Three-dimensional modeling is a hot issue in the field of computer science. Its modeling method is divided into two categories according to data sources: a modeling method based on three-dimensional scattered point and a modeling method based on images (single-frame, multi-frame, sequence). A three-dimensional laser scanning system can rapidly acquire three-dimensional positions and geometric texture information on surfaces of a target object, and is widely used in the field of three-dimensional modeling as data acquired has relatively high precision. However, most of the existing modeling methods obtain original point cloud data required by modeling by scanning a target through a specific scanning instrument, and then, in a late offline state, use a series of artificially designed precision optimization algorithms to process, such as splice, denoise, simplify, feature-extract and fuse, the acquired point cloud data, so as to obtain a high-precision three-dimensional model. Here, one key factor having a significant impact on modeling precision is measurement precision of a scanner that initially acquires data.

Most of the existing three-dimensional modeling technologies are applied to point cloud data with higher relative quality that has been pre-processed. That is, acquired discrete point clouds undergo certain artificial cleaning and filling offline, and then the discrete point clouds are calculated into a mesh model by using an artificially designed optimization algorithm which has high requirements for regularity of input data, i.e., a method based on computation geometry or a method based on implicit surface, plus certain texturing and rendering, to finally achieve the purpose of three-dimensional modeling. Thus, most of the existing high-precision three-dimensional modeling technologies heavily rely on measurement precision of hardware devices, and also require more artificial participation.

SUMMARY

In view of this, it is necessary to provide a method and system for automatically optimizing point cloud data quality.

The present invention provides a method for automatically optimizing point cloud data quality, and the method includes the following steps of: a. acquiring initial point cloud data for a target to be reconstructed, to obtain an initial discrete point cloud; b. performing preliminary data cleaning on the obtained initial discrete point cloud to obtain a Locally Optimal Projection operator (LOP) sampling model; c. obtaining a Possion reconstruction point cloud model by using a Possion surface reconstruction method on the obtained initial discrete point cloud; d. performing iterative closest point algorithm registration on the obtained Possion reconstruction point cloud model and the obtained initial discrete point cloud; and e. for each point on a currently registered model, calculating a weight of a surrounding point within a certain radius distance region of a position corresponding to the point for the point on the obtained LOP sampling model, and comparing the weight with a threshold, to determine whether a region where the point is located requires repeated scanning.

Wherein step a specifically comprises: acquiring initial point cloud data for the target to be reconstructed by using a three-dimensional laser scanner.

Wherein the three-dimensional laser scanner may be handheld, or an ordinary laser scanning device installed to the end of a manipulator with multi-degree of freedom.

Wherein step e specifically comprises: for each point on the currently registered model, calculating a weight of a surrounding point within a certain radius distance region of a position corresponding to the point for the point on the obtained LOP sampling model, and comparing the weight with a threshold; wherein, if the weight is greater, it indicates that distribution of cloud points nearby the point in the initial discrete point cloud obtained in step a is comparatively dense and conforms to a current modeling accuracy requirement, and it is unnecessary to repeatedly scan the region; if the weight is less, it indicates that distribution of cloud points nearby the point in the initial discrete point cloud obtained in step a is comparatively sparse, and later, the local region should be selectively rescanned, and the analysis process is repeated until the current modeling accuracy requirement is met; and if the weight is zero, it is determined that the point is obtained through calculus of interpolation in a Possion algorithm by a real three-dimensional laser scanning point in step c, and later, it is necessary to focus on scanning of a blind spot position where the point is located and repeat the analysis process until the current modeling accuracy requirement or an artificially set termination condition is met.

Wherein the artificially set termination condition is that the scanner cannot reach some positions or the number of repeated scanning exceeds an artificial predetermined value.

The present invention provides a system for automatically optimizing point cloud data quality, wherein the system comprises a data collection module, an original data sampling module, an original data reconstruction module, a model crude registration module and a model quality analysis module electrically connected with each other, wherein: the data collection module is configured to acquire initial point cloud data for a target to be reconstructed, to obtain an initial discrete point cloud; the original data sampling module is configured to perform preliminary data cleaning on the obtained initial discrete point cloud to obtain a Locally Optimal Projection operator (LOP) sampling model; the original data reconstruction module is configured to obtain a Possion reconstruction point cloud model by using a Possion surface reconstruction method on the obtained initial discrete point cloud; the model crude registration module is configured to perform iterative closest point algorithm registration on the obtained Possion reconstruction point cloud model and the obtained initial discrete point cloud; and the model quality analysis module is configured to, for each point on a currently registered model, calculate a weight of a surrounding point within a certain radius distance region of a position corresponding to the point for the point on the obtained LOP sampling model, and compare the weight with a threshold, to determine whether a region where the point is located requires repeated scanning.

Wherein the data collection module acquires initial point cloud data for the target to be reconstructed by using a three-dimensional laser scanner.

Wherein the three-dimensional laser scanner may be handheld, or an ordinary laser scanning device installed to the end of a manipulator with multi-degree of freedom.

Wherein the model quality analysis module, for each point on the currently registered model, calculates a weight of a surrounding point within a certain radius distance region of a position corresponding to the point for the point on the obtained LOP sampling model, and compares the weight with a threshold; wherein, if the weight is greater, it indicates that distribution of cloud points nearby the point in the initial discrete point cloud obtained in step a is comparatively dense and conforms to a current modeling accuracy requirement, and it is unnecessary to repeatedly scan the region; if the weight is less, it indicates that distribution of cloud points nearby the point in the initial discrete point cloud obtained in step a is comparatively sparse, and later, the local region should be selectively rescanned, and the analysis process is repeated until the current modeling accuracy requirement is met; and if the weight is zero, it is determined that the point is obtained through calculus of interpolation in a Possion algorithm by a real three-dimensional laser scanning point in step c, and later, it is necessary to focus on scanning of a blind spot position where the point is located and repeat the analysis process until the current modeling accuracy requirement or an artificially set termination condition is met.

Wherein the artificially set termination condition is that the scanner cannot reach some positions or the number of repeated scanning exceeds an artificial predetermined value.

The method and system for automatically optimizing point cloud data quality provided in the present invention, completely without manual intervention, automatically accomplishes a method for optimizing input point cloud data quality in three-dimensional modeling through feedback obtained by analyzing multi-scale local spatial information, and perform repeated scanning selectively, thereby providing richer multi-scale real scanning data for late high-precision modeling, which reduces dependency on inherent measurement precision of hardware.

DETAILED DESCRIPTION

The present invention is further described below in detail in combination with the accompanying drawings and specific embodiments.

Figure 1:
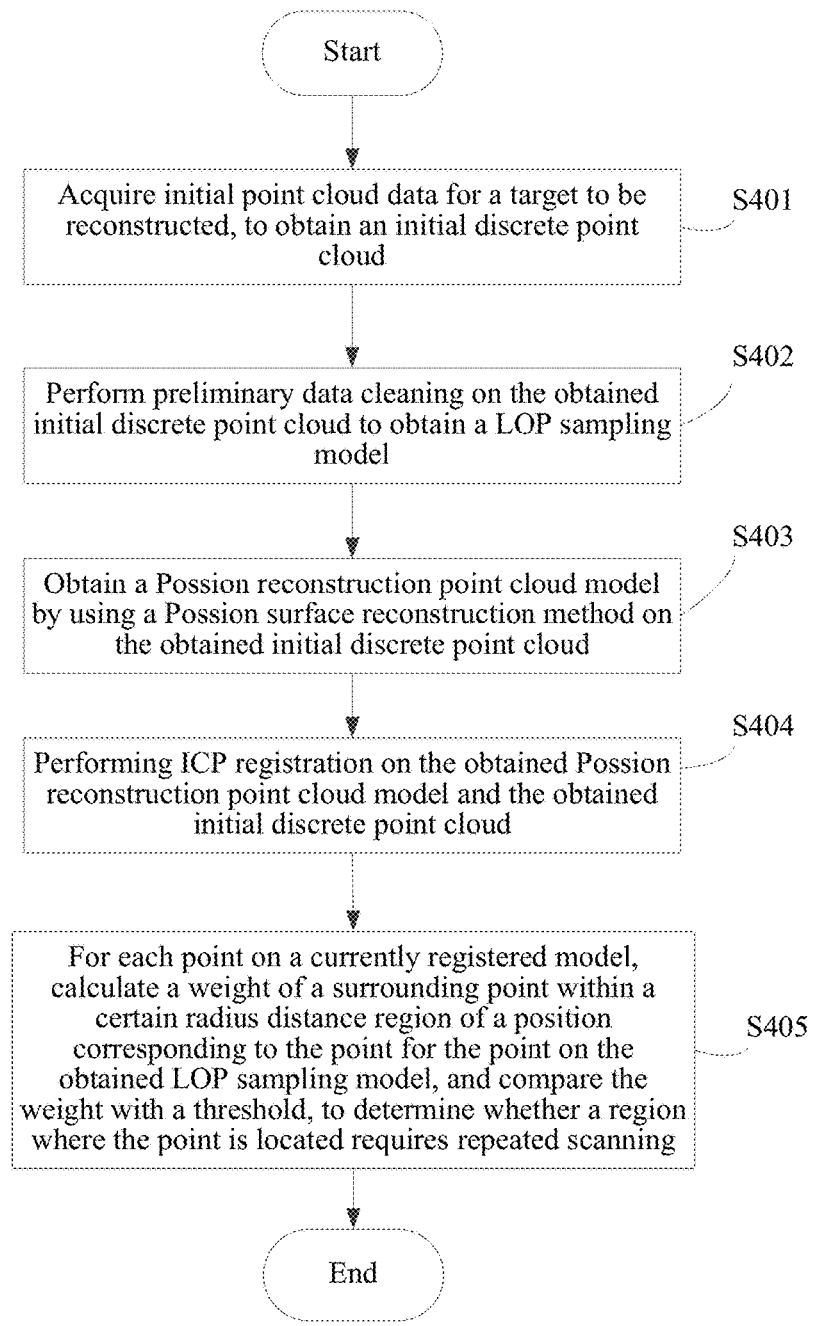
FIG. 1 is a flowchart of a method for automatically optimizing point cloud data quality according to the present invention.

Referring to FIG. 1, FIG. 1 is a flowchart of operation of a preferred embodiment of a method for automatically optimizing point cloud data quality according to the present invention.

Step S401. Acquire initial point cloud data for a target to be reconstructed, to obtain an initial discrete point cloud. Specifically, a three-dimensional laser scanner is adopted to preliminarily scan a target to be reconstructed, especially reconstructed object with greater volume and a more complicated geometric structure, such as elaborate sculptures and other crafts in a museum, in all directions from top to bottom and from left to right. The three-dimensional laser scanner may be handheld, or an ordinary laser scanning device installed to the end of a manipulator with multi-degree of freedom. Without considering some measurement blind zones brought about by laser measurement precision or a complicated geometric texture structure of a target, one initial discrete point cloud that indicates that density distribution of real three-dimensional position local points is not even is obtained in the step.

Step S402. Perform preliminary data cleaning on the obtained initial discrete point cloud to obtain a LOP sampling model, that is, select a LOP to perform preliminary downsampling and regularization operations on the data. Specifically, a LOP is selected to clean originally acquired data. The reason for adopting the LOP is because a relatively concise point cloud can be generated and geographic features of an originally input point cloud are kept at the same time, that is, surface information of three-dimensional objects with complicated geometric shapes can be approximately represented while noise and outliers are downsampled and eliminated. The LOP is easy to use, uses parameter-free modeling, and does not rely on local normal vectors, local surface patch matching and other local information, and thus it can efficiently put away noise that interferes with judgment of point directions in the originally input data. The LOP is especially applied to the following two situations where it is not easy to judge an input point direction: 1) one object having multiple folds in appearance which are close to each other; and 2) an object with a complicated geometric shape which is difficult to reconstruct with a local surface patch fitting method.

Step S403. Obtain a Possion reconstruction point cloud model by using a Possion surface reconstruction method on the obtained initial discrete point cloud. Specifically, a Possion surface reconstruction method is used. A Possion surface reconstruction process is a process of multi-scale space adaptive analysis, and it takes all discrete points in space as a whole for one-time consideration, and reconstructs a complete closed mesh model by solving a Possion equation without the help of heuristic space partition or mixing and other operations, so as to obtain a three-dimensional model in a mesh data level. In particular, a Possion surface reconstruction mechanism reduces dependency on a good linear sparse system, and has high robustness on noise interference.

Step S404. Register the obtained Possion reconstruction point cloud model and the obtained initial discrete point cloud. Specifically, the obtained Possion reconstruction point cloud model and the obtained initial discrete point cloud are registered through an Iterative Closest Point (ICP) algorithm, and are fused to obtain a next input model. The ICP algorithm, by looking for a relationship between corresponding matching points of two point sets, calculates transformation parameters of the two point sets, to meet convergence precision, and finally calculates evaluation and rotation parameters between the two point sets, to complete the registration process.

Step S405. For each point on a currently registered model, calculate a weight of a surrounding point within a certain radius distance region of a position corresponding to the point for the point on the obtained LOP sampling model, and compare the weight with a threshold, to determine whether a region where the point is located requires repeated scanning. Specifically, for each point on a currently registered model, a weight of a surrounding point within a certain radius distance region of a position corresponding to the point for the point is calculated on the obtained LOP sampling model, and the weight is compared with a threshold. If the weight is greater, it indicates that distribution of cloud points nearby the point in the initial discrete point cloud obtained in step S401 is comparatively dense and conforms to a current modeling accuracy requirement, and it is unnecessary to repeatedly scan the region; if the weight is less, it indicates that distribution of cloud points nearby the point in the initial discrete point cloud obtained in step S401 is comparatively sparse, and later, the local region should be selectively rescanned, and the analysis process is repeated until the current modeling accuracy requirement is met; and if the weight is zero, it can be determined that the point is obtained through calculus of interpolation in a Possion algorithm by a real three-dimensional laser scanning point in step S403, and later, it is necessary to focus on scanning of a blind spot position where the point is located and repeat the analysis process until the current modeling accuracy requirement or an artificially set termination condition is met. The artificially set termination condition includes: the scanner cannot reach some positions or the number of repeated scanning exceeds an artificial predetermined value.

Figure 2:
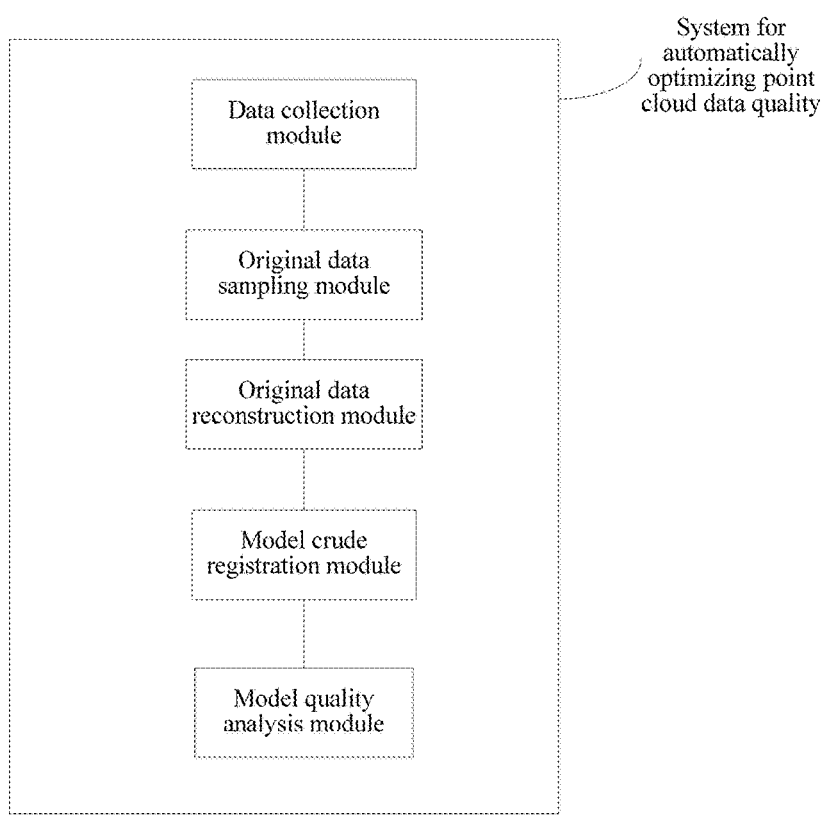
FIG. 2 is a hardware frame chart of a system for automatically optimizing point cloud data quality according to the present invention.

Referring to FIG. 2, FIG. 2 is a hardware frame chart of a system for automatically optimizing point cloud data quality according to the present invention. The system includes a data collection module, an original data sampling module, an original data reconstruction module, a model crude registration module and a model quality analysis module electrically connected with each other.

The data collection module is configured to acquire initial point cloud data for a target to be reconstructed. Specifically, the data collection module, by using a three-dimensional laser scanner, is adopted to preliminarily scan a target to be reconstructed, especially reconstructed object with greater volume and a more complicated geometric structure, such as elaborate sculptures and other crafts in a museum, in all directions from top to bottom and from left to right. The three-dimensional laser scanner may be handheld, or an ordinary laser scanning device installed to the end of a manipulator with multi-degree of freedom. Without considering some measurement blind zones brought about by laser measurement precision or a complicated geometric texture structure of a target, one initial discrete point cloud that indicates that density distribution of real three-dimensional position local points is not even is obtained in the step.

The original data sampling module is configured to perform preliminary data cleaning on the obtained initial discrete point cloud to obtain a LOP sampling model, that is, select a LOP to perform preliminary downsampling and regularization operations on the data. Specifically, a LOP is selected by the original data sampling module to clean originally acquired data. The reason for adopting the LOP is because a relatively concise point cloud can be generated and geographic features of an originally input point cloud are kept at the same time, that is, surface information of three-dimensional objects with complicated geometric shapes can be approximately represented while noise and outliers are downsampled and eliminated. The LOP is easy to use, uses parameter-free modeling, and does not rely on local normal vectors, local surface patch matching and other local information, and thus it can efficiently put away noise that interferes with judgment of point directions in the originally input data. The LOP is especially applied to the following two situations where it is not easy to judge an input point direction: 1) one object having multiple folds in appearance which are close to each other; and 2) an object with a complicated geometric shape which is difficult to reconstruct with a local surface patch fitting method.

The original data reconstruction module is configured to obtain a Possion reconstruction point cloud model by using a Possion surface reconstruction method on the initial discrete point cloud obtained by the data collection module. Specifically, a Possion surface reconstruction method is used by the original data reconstruction module. A Possion surface reconstruction process is a process of multi-scale space adaptive analysis, and it takes all discrete points in space as a whole for one-time consideration, and reconstructs a complete closed mesh model by solving a Possion equation without the help of heuristic space partition or mixing and other operations, so as to obtain a three-dimensional model in a mesh data level. In particular, a Possion surface reconstruction mechanism reduces dependency on a good linear sparse system, and has high robustness on noise interference.

The model crude registration module is configured to fuse the obtained Possion reconstruction point cloud model and the obtained initial discrete point cloud through an ICP registration method, to obtain an input model of the model quality analysis module. Specifically, the obtained Possion reconstruction point cloud model and the obtained initial discrete point cloud are registered through an Iterative Closest Point (ICP) algorithm, and are fused to obtain a next input model by the model crude registration module. The ICP algorithm, by looking for a relationship between corresponding matching points of two point sets, calculates transformation parameters of the two point sets, to meet convergence precision, and finally calculates evaluation and rotation parameters between the two point sets, to complete the registration process.

The model quality analysis module is configured to, for each point on a currently registered model, calculate a weight of a surrounding point within a certain radius distance region of a position corresponding to the point for the point on the obtained LOP sampling model, and compare the weight with a threshold, to determine whether a region where the point is located requires repeated scanning. Specifically, for each point on a currently registered model, a weight of a surrounding point within a certain radius distance region of a position corresponding to the point for the point is calculated on the obtained LOP sampling model, and the weight is compared with a threshold by the model quality analysis module. If the weight is greater, it indicates that distribution of cloud points nearby the point in the initial discrete point cloud obtained in step S401 is comparatively dense and conforms to a current modeling accuracy requirement, and it is unnecessary to repeatedly scan the region; if the weight is less, it indicates that distribution of cloud points nearby the point in the initial discrete point cloud obtained in step S401 is comparatively sparse, and later, the local region should be selectively rescanned, and the analysis process is repeated until the current modeling accuracy requirement is met; and if the weight is zero, it can be determined that the point is obtained through calculus of interpolation in a Possion algorithm by a real three-dimensional laser scanning point in step S403, and later, it is necessary to focus on scanning of a blind spot position where the point is located and repeat the analysis process until the current modeling accuracy requirement or an artificially set termination condition is met. The artificially set termination condition includes: the scanner cannot reach some positions or the number of repeated scanning exceeds an artificial predetermined value.

Although the present invention is described with reference to current preferred embodiments, those skilled in the art should understand that, the preferred embodiments are merely used to describe the present invention, instead of being used to limit the protection scope of the present invention. Any modification, equivalent replacement, improvement and the like made within the spirit and principle scope of the present invention should be included in the protection scope of the present invention.

What is claimed is:

1. A method for automatically optimizing point cloud data quality, comprising the following steps of:
    a. acquiring initial point cloud data for a target to be reconstructed, to obtain an initial discrete point cloud;
    b. performing preliminary data cleaning on the obtained initial discrete point cloud to obtain a Locally Optimal Projection operator (LOP) sampling model;
    c. obtaining a Possion reconstruction point cloud model by using a Possion surface reconstruction method on the obtained initial discrete point cloud;
    d. performing iterative closest point algorithm registration on the obtained Possion reconstruction point cloud model and the obtained initial discrete point cloud; and
    e. for each point on a currently registered model, calculating a weight of a surrounding point within a certain radius distance region of a position corresponding to the point for the point on the obtained LOP sampling model, and comparing the weight with a threshold, to determine whether a region where the point is located requires repeated scanning.

2. The method according to claim 1, wherein step a specifically comprises: acquiring initial point cloud data for the target to be reconstructed by using a three-dimensional laser scanner.

3. The method according to claim 2, wherein the three-dimensional laser scanner may be handheld, or an ordinary laser scanning device installed to the end of a manipulator with multi-degree of freedom.

4. The method according to claim 1, wherein step e specifically comprises:
    for each point on the currently registered model, calculating a weight of a surrounding point within a certain radius distance region of a position corresponding to the point for the point on the obtained LOP sampling model, and comparing the weight with a threshold;
    wherein, if the weight is greater, it indicates that distribution of cloud points nearby the point in the initial discrete point cloud obtained in step a is comparatively dense and conforms to a current modeling accuracy requirement, and it is unnecessary to repeatedly scan the region;
    if the weight is less, it indicates that distribution of cloud points nearby the point in the initial discrete point cloud obtained in step a is comparatively sparse, and later, the local region should be selectively rescanned, and the analysis process is repeated until the current modeling accuracy requirement is met; and
    if the weight is zero, it is determined that the point is obtained through calculus of interpolation in a Possion algorithm by a real three-dimensional laser scanning point in step c, and later, it is necessary to focus on scanning of a blind spot position where the point is located and repeat the analysis process until the current modeling accuracy requirement or an artificially set termination condition is met.

5. The method according to claim 4, wherein the artificially set termination radius condition is that the scanner cannot reach some positions or the number of repeated scanning exceeds an artificial predetermined value.

6. A system for automatically optimizing point cloud data quality, wherein the system comprises a data collection module, an original data sampling module, an original data reconstruction module, a model crude registration module and a model quality analysis module electrically connected with each other, wherein:
    the data collection module is configured to acquire initial point cloud data for a target to be reconstructed, to obtain an initial discrete point cloud;
    the original data sampling module is configured to perform preliminary data cleaning on the obtained initial discrete point cloud to obtain a Locally Optimal Projection operator (LOP) sampling model;
    the original data reconstruction module is configured to obtain a Possion reconstruction point cloud model by using a Possion surface reconstruction method on the obtained initial discrete point cloud;
    the model crude registration module is configured to perform iterative closest point algorithm registration on the obtained Possion reconstruction point cloud model and the obtained initial discrete point cloud; and
    the model quality analysis module is configured to, for each point on a currently registered model, calculate a weight of a surrounding point within a certain radius distance region of a position corresponding to the point for the point on the obtained LOP sampling model, and compare the weight with a threshold, to determine whether a region where the point is located requires repeated scanning.

7. The system according to claim 6, wherein the data collection module acquires initial point cloud data for the target to be reconstructed by using a three-dimensional laser scanner.

8. The system according to claim 7, wherein the three-dimensional laser scanner may be handheld, or an ordinary laser scanning device installed to the end of a manipulator with multi-degree of freedom.

9. The system according to claim 6, wherein the model quality analysis module, for each point on the currently registered model, calculates a weight of a surrounding point within a certain radius distance region of a position corresponding to the point for the point on the obtained LOP sampling model, and compares the weight with a threshold;
    wherein, if the weight is greater, it indicates that distribution of cloud points nearby the point in the initial discrete point cloud obtained in step a is comparatively dense and conforms to a current modeling accuracy requirement, and it is unnecessary to repeatedly scan the region;
    if the weight is less, it indicates that distribution of cloud points nearby the point in the initial discrete point cloud obtained in step a is comparatively sparse, and later, the local region should be selectively rescanned, and the analysis process is repeated until the current modeling accuracy requirement is met; and
    if the weight is zero, it is determined that the point is obtained through calculus of interpolation in a Possion algorithm by a real three-dimensional laser scanning point in step c, and later, it is necessary to focus on scanning of a blind spot position where the point is located and repeat the analysis process until the current modeling accuracy requirement or an artificially set termination condition is met.

10. The system according to claim 9, wherein the artificially set termination condition is that the scanner cannot reach some positions or the number of repeated scanning exceeds an artificial predetermined value.

\* \* \* \* \*